April 9, 1963 H. SCHMID 3,084,580
HYDRAULICALLY CONTROLLED PUNCHING MACHINE
Filed April 29, 1958
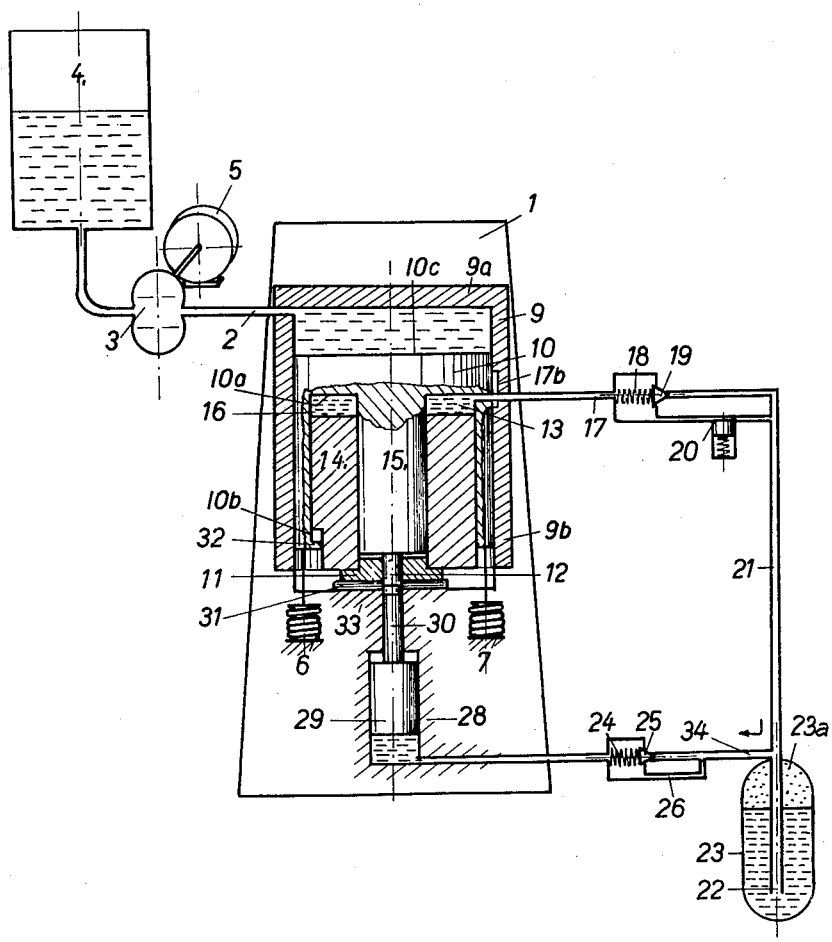
INVENTOR.
Heinrich Schmid
BY United States Patent Office 3,084,580
Patented Apr. 9, 1963

3,084,580
HYDRAULICALLY CONTROLLED PUNCHING MACHINE
Heinrich Schmid, Rapperswil, Switzerland, assignor to Almatic A.G., Glarus, Switzerland, a Swiss company
Filed Apr. 29, 1958, Ser. No. 731,711
Claims priority, application Switzerland Apr. 30, 1957
5 Claims. (Cl. 83—123)

The present invention relates to an improved method of fine stamping, i.e. of producing cut surfaces having a low degree of roughness in shaping by stamping. Employing comparatively simple means, this method particularly enables the appropriate development of power to be obtained at the tool, which is a prerequisite for the operation of fine stamping or pressure cutting. The method is of particular importance for the manufacture of machine members such as gears, pawls and other members wherein the cut surfaces perform gear-type functions such as rolling, transmitting or controlling.

The more recent fine stamping or pressure cutting methods are based on the principle of creating very high compressive stresses in the material to be sampled and of rigidly clamping the material during the stamping operation. Local yield conditions are required to be obtained in the cutting area. In order to achieve this aim, the material is very strongly clamped, often even by stamping locking grooves. This clamped condition should then be kept as unchanged as possible during the cutting operation. The cutting operation itself is performed at the portion clamped between the punch and counter-punch by sliding it out from the original material plane determined by the outer clamping. The ratio between the stamping speed and the clamping forces is of considerable importance for the flow conditions. Several proposals have been made for its control.

In particular, it has been proposed to feed the cylinders for clamping the material and for the stamping members by adjustable hydraulic pumps for the performance of such fine stamping operations in heavy hydraulic presses. For lesser requirements, annular springs for the holddown plate or pneumatic pads for the counter-punch have been suggested.

However, all these proposals have not been entirely satisfactory since they have required a great many controls or else were not in a position to control the clamping pressure during cutting to the degree desired. In the claming device using springs, the clamping pressure depends on the punch stroke, i.e. it increases with the stroke of the punching tool and reaches its maximum at the lowest punch position. This causes the remaining material to be crushed to the punch, particularly when the clamping pressure reached the necessary high degree already at the beginning of the cut. When feeding the holddown plate by a separate pump, separate hydraulic members are required, which involves considerablbe additional technical effort owing to the large forces and demands made on the accuracy of guidance. An operative connection with the cutting speed determined by the shaping rate of the material under predetermined pressure can be achieved only by means of complex control members. At the same time the design of the device should comply with demands for simplicity which a rapidly performed technological process makes of the members involved.

The present invention has for its object to eliminate the drawbacks of the said fine stamping process in respect of the technical requirements and the adaptation of the holddown pressure to the cutting process.

The present method of fine stamping by means of a stamping machine and a stamping tool comprising at least one holddown and a punch consists in that the pressure exerted on the work by the hold-down is controlled by the velocity of motion of the punch.

This pressure can advantageously be built up by a hydraulic liquid enclosed between the punch holder and the hold-down, which is driven from this space via a throttle point which is placed under prestress from its rear.

This prestress may advantageously be employed to strip the material from the stamp by means of the holddown.

The device according to this invention for the performance of this method is characterized by the fact that at least one hydraulic pressure pad and a communicating outflow regulator are provided between the members driving the punch and the hold-down.

The said outflow regulator may have a particular pressure/quantity characteristic in the sense that the exit resistance is increased at small outflow quantities. It may further be designed as a check valve hich allows the medium under prestress free passage at the rear of the regulator while restricting the liquid flowing from the pad.

Prestress may be built up by a pneumatic pressure tank.

The device may be completely incorporated in the interior of the movable piston of a hydraulic stamping machine.

The drawing shows a diagrammatic longitudinal section of an embodiment of the device for the performance of the method according to this invention.

Arranged in the frame 1 of a stamping machine is a main piston 10 which is hydraulically movable in the main cylinder 9 having an upper end 9a and lower end 9b. Pressure oil is supplied to the main cylinder 9 by pump 3 via line 2. The pressure oil is held in a reservoir 4. The motor 5 is reversible and makes it possible either to supply oil into the main cylinder 9 or to pump ti therefrom. The springs 6 and 7 are also designed to return the main piston 10 to its extreme top position.

Provided adjacent the upper internal surface 10a of piston 10 is a further cylindrical chamber 16 which terminates below the upper end 10c of the main piston 10. A piston 14 of annular cross-section is freely movable longitudinally therein. Its lowermost position is determined by a stop 32 provided the lower end 10b of the main piston 10. The main piston 10 is provided with a central rod or core 15 extending through the annular piston 14 and designed as a punch holder. At the lower face of the piston 14 is a plate 11 serving as a hold-down. Inserted in punch holder 15 is the punch 12. The hold-down 11 and the punch 12 form the upper portion of the punching tool. Arranged in the die 33, which is rigidly attached to the frame 1, is a counter-punch 30 having a piston 29 longitudinally movable in the cylinder 28.

The annular hollow space 16 is filled with a hydraulic pressure medium 13, by way of example oil, and connected, via line 17 including the recess 17b formed in the wall of the cylinder 9 to a valve and throttle assembly comprising the spring 18, the valve body 19 and the check valve line 20. The rear end of this valve and throttle assembly is connected to a hydro-pneumatic tank 23 via line 21, which is supplied with oil via the pipe 22. This tank 23 is under pneumatic pressure.

Another line 34 leads, from the pneumatic tank 23, to a check valve comprising the valve body 25 and a spring 24, and hence to the cylinder 28 of the counter-punch 30.

Throttle 20 may be formed by a spring loaded valve member which normally closes the by-pass line that is parallel to valve 18, 19. In known manner the spring load exerted on the valve member may be regulated by an adjusting screw. The spring load determines the pressure at which the throttle valve will open to permit the escape of high pressure fluid from line 17 if piston 10 moves downward after piston 14 has reached its lowermost position. The pressure at which valve 20 will open is higher than the pressure in the tank or accumulator 23. Low pressure fluid will enter line 17 through valve 18, 19 if the pressure in chamber 16 is reduced below the pressure in the accumulator 23 due to the rising movement of piston 190. It will be understood that it is highly desirable to force piston 14 downwards with increased pressure while the punch 12 engages and penetrates the workpiece 31. The arrangement with respect to throttle 26 is similar to that of throttle 20.

The operation of this device is as follows:

The main piston 10 begins to drop when pump 3 supplies oil to the main cylinder 9. At the same time, the incorporated annular piston 14 moves downward until its plate hold-down 11 engages the work 31.

If the pump 3 continues to deliver, the piston 14 can no longer respond and begins to force oil from the cylindrical space 16. The oil can escape through line 17 but builds up pressure at the throttle 20 which pressure is determined by the rate of outflow. The said rate of outflow in turn depends on the downward speed of the main piston 10, i.e. on the speed at which the punch 12 approaches the work and penetrates it. The pressure reacts on the annular surface of the piston 14 and determines the contact pressure of the hold-down 11 on the work 31. This contact pressure, too, is at all times a function of the downward speed of the piston 10 and the punch 12 respectively.

In the course of the downward movement the punch 12 begins to enter the work 31 and to overcome the pressure of the counter-punch 30 which also builds up owing to the fact that the hydraulic medium in cylinder 28 can drain only via the throttle line 26. The work is pierced, the interior pressure prestress of the work both between the hold-down plate 11 and die 33 and between punch 12 and counter-punch 30 being always dependent on the downward speed of the punch. When the downward movement stops at the lower end of the stroke, the pressure drops to the level of the counter-pressure in tank 23.

The annular space 16 and the piston 14 therefore constitute a hydraulic pressure pad.

The pump 3 is then reversed; the main piston 10 rises, the tank pressure returns, via the check valve 18, into the cylinder 16 and the hold-down 11 strips the material residue from the punch 12 under the action of the annular piston 14, which drops. The medium enters cylinder 28 via line 34 from the pneumatic tank 23, the piston 29 rises together with the counter-punch 30, the stamping is lifted from the die 33.

Tests have shown that particularly favourable stamping conditions are obtained by the described control of the pressure exerted on the hold-down and on the counter-punch as a function of the downward speed of the punch. The downward speed of the punch is not determined purely by the machine but is largely dependent on the resistance to deformation of the processed material itself. Any retardation, however, causes a reduction of the clamping pressure as any acceleration, which is e.g. caused by an incipient crack in the material, increases the pressure prestress. This increases the plastic deformability of the material and the danger of cracking is eliminated. Even where the material processed is of considerable thickness, by way of example 20 mm., parts can be formed with cut surfaces of which the finish is approximately comparable to that of a milled surface.

Against the pressure cutting processes in which the pressure of the hold-down and of the counter-punch controlled by springs continuously rises with the stroke, the control according to this invention avoids crushing the material on the punch as must occur when the pressure of the hold-down increases with the travel of the punch as is the case with previous solutions. Operation according to the present method substantially increases the life of the tools, which has been very moderate with the older pressure cutting processes. It is also of importance that differences in the sheet thickness exercise no influence on the clamping pressure in the method disclosed because the said pressure does not depend, at constant downward speed, on the point where the hold-down contacts the work. The adaptation of the clamping pressures is almost instantaneous, i.e. dependent on the speed of travel of the pressure surge as may be caused by acceleration at the throttle 20. In controls employing several pumps such a rapid adaptation cannot be obtained if only owing to the inertia of the control members. The present method therefore also enables the number of strokes to be substantially increased as compared to the complicated solutions employing multi-pump controls.

Having now particularly described and ascertained the nature of my said invention and in what manner the same is to be performed, I declare that what I claim is:

1. A hydraulically controlled stamping machine comprising a main cylinder, a main piston having an upper and a lower end and reciprocally movable within said main cylinder, a punch rigidly connected to the lower end of said main piston, an annular chamber within said main piston extending rearwardly from said lower end and terminating below said upper end at an upper internal surface of said main piston, said upper internal surface of said main piston having a given contact area for contact with a fluid medium, an annular piston reciprocally movable within said annular chamber, holder means cooperable with the bottom of said annular piston, first means for supplying a hydraulic fluid to said main cylinder to drive said main piston, a counter-punch supported in alignment with said punch, a further piston rigidly connected to said counter punch, a further cylinder wherein said further piston is reciprocally movable, second means for supplying a fluid medium under pressure to said annular chamber and said further cylinder, said second means including a first check valve and first throttle valve means adapted to cooperate with said annular chamber and a second check valve and second throttle means in registry with said further cylinder, said respective throttle valve means being movable into an open position under the influence of a changeable pressure magnitude which in all instances of said open position of said respective throttle valve means is greater than the pressure exerted by said fluid medium supplied from said second means, said changeable pressure magnitude being at least a function of the velocity of movement of said main piston and the given contact area of said upper surface, whereby the rate of return flow of said fluid medium from said annular chamber through said first throttle valve means is regulated to thus influence in a controlled manner operation of said punch and holder means.

2. A hydraulically controlled stamping machine comprising a main cylinder having a lower end, a main piston having an upper and a lower end and reciprocably movable within said main cylinder, a punch rigidly connected to the lower end of said main piston, an annular chamber disposed between said upper end of said main piston and said lower end of said main cylinder, said main piston having an upper internal surface of given contact area for contact with a fluid medium, an annular piston freely reciprocably movable within said annular chamber below said upper internal surface, holder means cooperable with said annular piston, first means for driving said main piston, a counter-punch supported in alignment with said punch, a further piston rigidly connected to said counter punch, a further cylinder wherein said further piston is reciprocally movable, second means for supplying a fluid medium under pressure to said annular chamber and said further cylinder, said second means including a reservoir and a first check valve and first throttle valve means adapted to cooperate with said annular chamber and a second check and second throttle means valve in registry with said further cylinder, said respective throttle valve means being movable into an open position under the influence of a changeable pressure magnitude which in all instances of said open position of said respective throttle valve means is greater than the pressure exerted by said fluid medium supplied from said second means, said changeable pressure magnitude being at least a function of the velocity of movement of said main piston and the given contact area of said upper surface, whereby the rate of return flow of said fluid medium from said annular chamber through said first throttle valve means to said reservoir and said further cylinder is regulated to thus influence in a controlled manner operation of said punch and holder means.

3. A hydraulic controlled stamping machine comprising a main cylinder, a main piston having an upper and lower end reciprocally movable within said main cylinder, a punch rigidly connected to the lower end of said main piston, an annular chamber within said main piston extending upwardly from said lower end and terminating below said upper end, an annular piston reciprocally movable within said annular chamber, holder means operatively connected to the bottom of said annular piston, a storage reservoir for hydraulic fluid, said storage reservoir being connected by means of a first conduit to said main cylinder and adapted to supply said hydraulic fluid to said main cylinder to drive said main piston and said punch through a punching operation, a counter-punch supported below said punch, a further piston to which said counter-punch is rigidly connected, and a further cylinder wherein said further piston is reciprocally movable, a pneumatic pressure reservoir adapted to supply a fluid medium under pressure to said annular chamber and said further cylinder, a second conduit interconnecting said pressure reservoir and said annular chamber, and a third conduit interconnecting said pressure reservoir and said further cylinder, a first check valve means in said second conduit opening for flow toward said annular chamber, first throttle means bridging said first check valve means, a second check valve means in said third conduit opening for flow toward said further cylinder, and second throttle means bridging said second check valve means, whereby said hydraulic fluid received from said storage reservoir drives said main piston toward said holder means during said punching operation to expel at least a portion of said fluid medium located in said annular chamber in the direction of said pressure reservoir via said first throttle means, said fluid medium appearing in said second and third conduits during said punching operation having a pressure greater than that developed by said pneumatic pressure reservoir and being sufficient to close said first and second check valve means and to open said first and second throttle means, to permit flow of said fluid medium during punching to said pneumatic pressure reservoir.

4. A hydraulic controlled stamping machine comprising a main cylinder, a main piston having an upper and lower end reciprocally movable within said main cylinder, a punch rigidly connected to the lower end of said main piston, an annular chamber within said main piston extending upwardly from said lower end and terminating below said upper end, an annular piston reciprocally movable within said annular chamber, holder means adapted to cooperate with the bottom of said annular piston, a storage reservoir for hydraulic fluid, said storage reservoir being connected by means of a first conduit to said main cylinder and adapted to supply said hydraulic fluid to said main cylinder to drive said main piston and said punch through a punching operation, a pump interposed in said first conduit for forcing hydraulic fluid into said main cylinder, a counter-punch supported below said punch, a further piston to which said counter-punch is rigidly connected, and a further cylinder wherein said further piston is reciprocally movable, a pneumatic pressure reservoir adapted to supply a fluid medium under pressure to said annular chamber and said further cylinder, a second conduit interconnecting said pressure reservoir and said annular chamber, and a third conduit interconnecting said pressure reservoir and said further cylinder, a first check valve means in said second conduit opening for flow towards said annular chamber, first throttle means bridging said first check valve means, a second check valve means in said third conduit opening for flow towards said further cylinder, and second throttle means bridging said second check valve means, whereby said hydraulic fluid received from said storage reservoir drives said main piston toward said holder means during said punching operation to expel at least a portion of said fluid medium located in said annular chamber in the direction of said pressure reservoir via said first throttle valve means, said fluid medium appearing in said second and third conduits during said punching operation having a pressure greater than that developed by said pneumatic pressure reservoir and being sufficient to close said first and second check valve means and to open said first and second throttle means, to permit flow of said fluid medium during punching to said pneumatic pressure reservoir.

5. A hydraulic controlled stamping machine comprising a main cylinder, a main piston having an upper and lower end reciprocally movable within said main cylinder, means resiliently urging said main piston in an upwardly direction, a punch rigidly connected to the lower end of said main piston, an annular chamber within said main piston extending upwardly from said lower end and terminating below said upper end, an annular piston reciprocally movable within said annular chamber, holder means disposed adjacent the bottom of said annular piston, a storage reservoir for hydraulic fluid, said reservoir being connected by means of a first conduit to said main cylinder and adapted to supply said hydraulic fluid to said main cylinder to drive said main piston and said punch through a punching operation, and a pump interposed in said first conduit for forcing hydraulic fluid into said main cylinder, a counter-punch supported below said punch, a further piston to which said counter punch is rigidly connected, and a further cylinder wherein said further piston is reciprocally movable, a pneumatic pressure reservoir for supplying a fluid medium under pressure to said annular chamber and said further cylinder, a second conduit interconnecting said pressure reservoir and said annular chamber, and a third conduit interconnecting said pressure reservoir and said further cylinder, a first check valve means in said second conduit opening for flow towards said annular chamber, first throttle means bridging said first check valve means, a second check valve means in said third conduit opening for flow towards said further cylinder, and second throttle means bridging said second valve means, whereby said hydraulic fluid received from said storage reservoir drives said main piston toward said holder means during said punching operation to expel at least a portion of said fluid medium located in said annular chamber in the direction of said pressure reservoir via said first throttle valve means, said fluid medium appearing in said second and third conduits during said punching operation having a pressure greater than that developed by said pneumatic pressure reservoir and being sufficient to close said first and second check valve means and to open said first and second throttle means, to permit flow of said fluid medium during punching to said pneumatic pressure reservoir.

References Cited in the file of this patent

UNITED STATES PATENTS

| | | | |
|---|---|---|---|
| 528,738 | Pfouts | Nov. 6, | 1894 |
| 1,625,748 | Schiers | Apr. 19, | 1927 |
| 2,534,292 | Mueller | Dec. 19, | 1950 |
| 2,586,695 | Mueller | Feb. 19, | 1952 |
| 2,632,511 | Hamilton | Mar. 24, | 1953 |
| 2,716,451 | Taylor | Aug. 30, | 1955 |
| 2,758,652 | Novinger | Aug. 14, | 1956 |
| 2,776,540 | Kraujalis | Jan. 8, | 1957 |
| 2,808,104 | Peterson | Oct. 1, | 1957 |
| 2,844,204 | Beebee | July 22, | 1958 |

FOREIGN PATENTS

| | | | |
|---|---|---|---|
| 803,064 | Germany | Feb. 26, | 1951 |